United States Patent [19]
Oschwald

[11] Patent Number: 5,564,664
[45] Date of Patent: Oct. 15, 1996

[54] SPHERICAL SUSPENSION FOR A TECHNICAL INSTRUMENT

[76] Inventor: Max Oschwald, Fadmatt 26, CH-8902, Urdorf, Switzerland

[21] Appl. No.: 314,066

[22] Filed: Sep. 28, 1994

[30] Foreign Application Priority Data

Oct. 13, 1993 [CH] Switzerland ............ 03078/93

[51] Int. Cl.⁶ .................................................. A47F 5/00
[52] U.S. Cl. .............................. 248/288.51; 248/288.31; 403/111; 403/144
[58] Field of Search ............ 248/288.5, 288.31, 248/481, 181, 324; 403/111, 122, 90, 144

[56] References Cited

U.S. PATENT DOCUMENTS

| | | | |
|---|---|---|---|
| 3,790,249 | 2/1974 | Treace | 350/91 |
| 4,170,336 | 10/1979 | Malis | 248/276 |
| 4,834,519 | 5/1989 | Twisselmann | 350/522 |
| 5,073,417 | 12/1991 | Bowerman | 248/288.3 |

*Primary Examiner*—Karen J. Chotkowski
*Assistant Examiner*—Anita M. King
*Attorney, Agent, or Firm*—Martin A. Farber

[57] ABSTRACT

The suspension (1) permits of the almost frictionless swinging into equilibrium position of an instrument (53) fastened to an instrument holder (5). For the balancing of the weight or the swinging into the position of equilibrium, the spherical end (7) of the instrument holder (5) is raised. In the raised position, there is an approximately punctiform resting surface between the holding part (3), the suspension (1), and the instrument holder (5). After the instrument has swung into the equilibrium position, the spherical end (7) of the instrument holder (5) can be held clamped fast over a large surface by turning the shaft (19) which has eccentric disks (25).

10 Claims, 2 Drawing Sheets

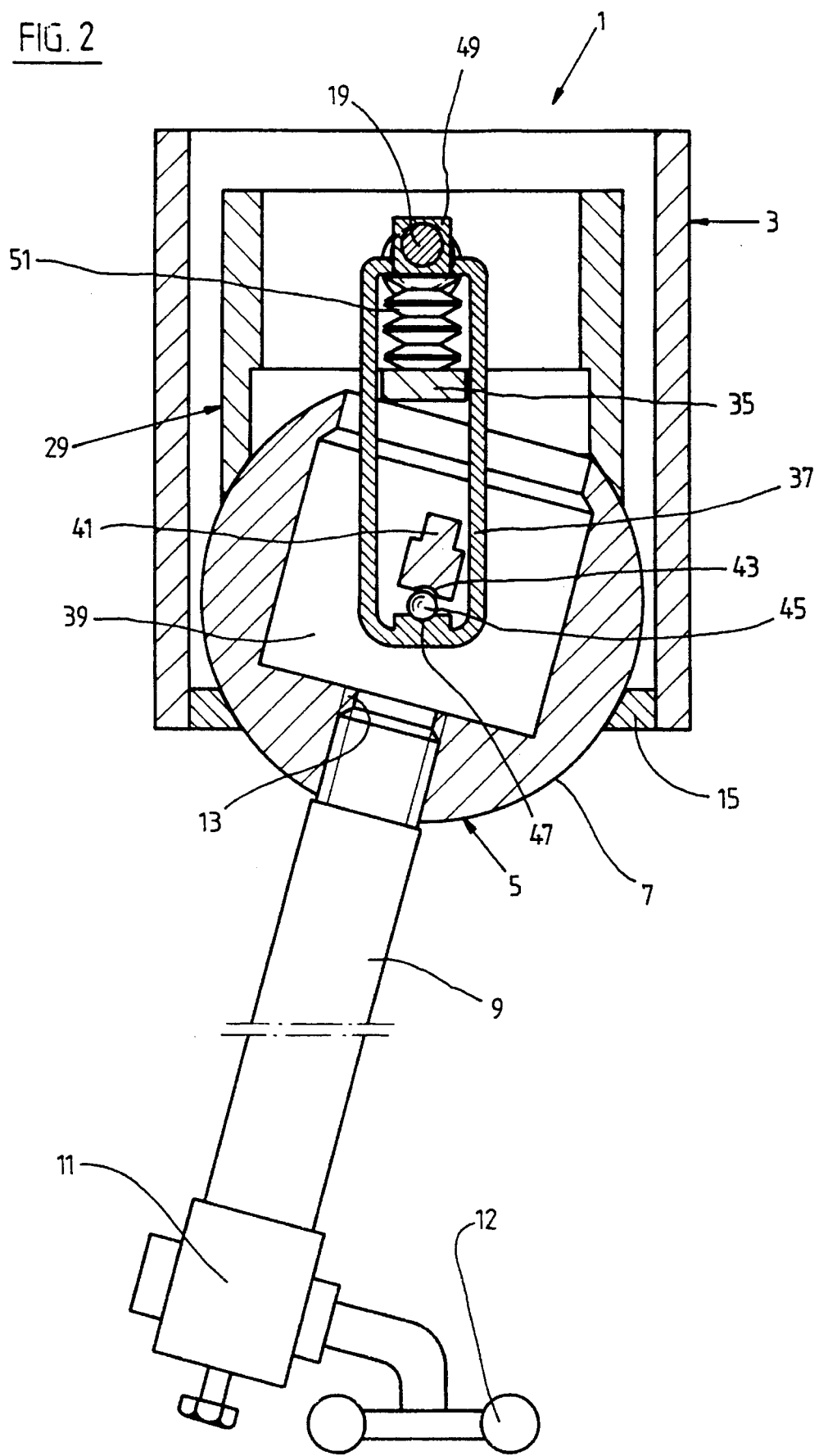

5,564,664

SPHERICAL SUSPENSION FOR A TECHNICAL INSTRUMENT

FIELD AND BACKGROUND OF THE INVENTION

The invention relates to a spherical suspension for a technical instrument, in general, and to a spherical suspension for a technical instrument having a holding part for receiving and mounting of a spherical-segment-shaped end of an instrument holder and having a device for locking the instrument holder with respect to the holding part, in particular.

Spherical suspensions are known which have a holding part with a spherical receiver for the spherical or spherical-segment-shaped end of a holding part. Such suspensions are used, for instance, for the suspending of heavy microscopes over an operating table. A microscope suspended from such a spherical mount swings back and forth into a position of equilibrium when its instrument holder is not locked with respect to the mount. Heavy instruments can overcome the friction within the suspension relatively easily and thus find their approximate equilibrium; on the other hand, the friction in the spherical suspension acts against lighter instruments so that a dependable swinging back and forth into the equilibrium position is not possible.

SUMMARY OF THE INVENTION

The object of the present invention is to create a spherical suspension which permits the dependable swinging back and forth of the load suspended from it into the equilibrium position and permits the locking of the load in the equilibrium position without further displacement.

Proceeding from a spherical suspension of this type, the object of the invention is achieved in the manner that in the center of the spherical-segment-shaped end (7), a resting means (45) for a substantially punctiform resting in the holding part (3) is inserted.

Upon the loosening of the lock which is produced by a clamping of the upper surface of the spherical end of the instrument holder to the holding part, the spherical end of the instrument holder is lifted out of its support on the holding part and is still suspended only on a substantially punctiform support present in the center of the spherical end. In this way, the instrument holder can move approximately free of friction with respect to the holding part and can swing into its position of equilibrium regardless of the weight of the instrument holder. The locking of the instrument holder into the position in which it has swung is effected by the lowering of the instrument holder and the entry of the spherical end into the holding part. In this way, displacement of the instrument holder upon the locking is prevented and furthermore locking is permitted without indentations being produced on the spherical end of the instrument holder by the locking means.

BRIEF DESCRIPTION OF THE DRAWINGS

With the above and other advantages in view, the present invention will become more clearly understood in connection with the detailed description of a preferred embodiment, when considered with the accompanying drawings of which:

FIG. 2 is a longitudinal section through a holding part with an instrument holder inserted therein, along the line II—II in FIG. 1, locked in position.

DETAILED DESCRIPTION OF THE PREFERRED EMBODIMENT

Figure 1:
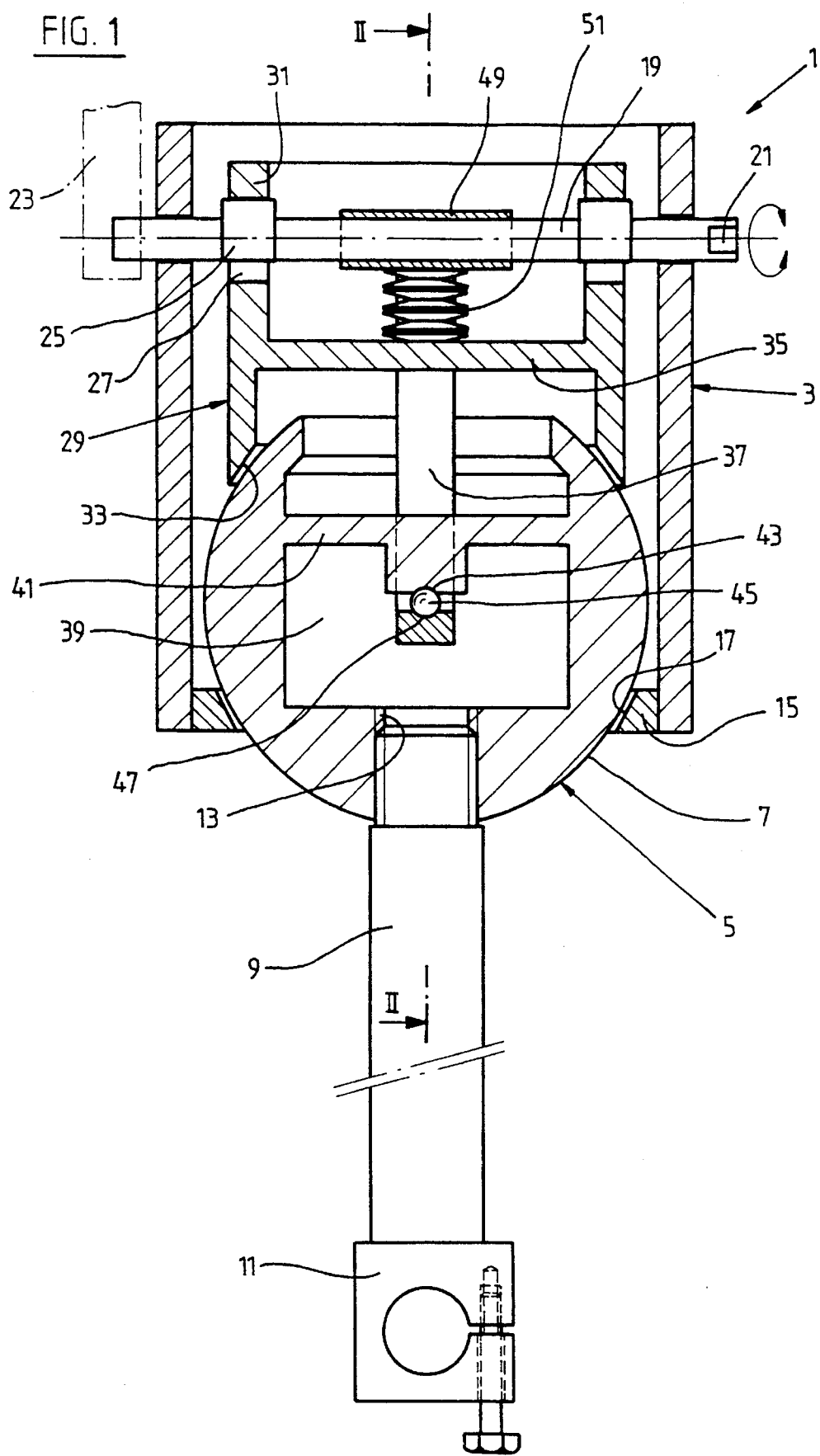
FIG. 1 is a longitudinal section through a holding part with an instrument holder inserted therein, but not locked in position.

A spherical suspension 1 has a cylindrical holding part 3 on the top and an instrument holder 5 at the bottom. The instrument holder 5 has an end 7 in the shape of a spherical segment on which there is fastened an arm 9 to the end of which an instrument 12 can be fastened, for instance, by a cylindrical clamp 11. The instrument holder 5 can be screwed into a threaded hole 13 in the spherical-segment-shaped end 7.

At the bottom of the holding part 3 a clamping ring 15 is fastened or developed, its bore being preferably conical. In the upper section of the holding part 3 there is inserted a diagonally extending shaft 19 which is rotatably mounted at its two ends in the holding part 3 and has, on at least one of its ends, a recess 21 for the introduction and holding, fixed against turning, of a tool, for instance an Allen wrench. Instead of a recess 21, a lever 23 which is attached at a right angle to the end of the shaft can, of course, be used (indicated in dash-dot lines). Two eccentric disks 25 are fastened, fixed against rotation, on the shaft 19. Each of the eccentric disks 25 lies in an opening 27 in a holding sleeve 29. The holding sleeve 29 has a cylindrical outer wall 31 the lower end surface 33 of which is preferably conical. A downwardly extending strap 37 is fastened on a cross member or partition 35 of the holding sleeve 29. The strap 37 engages into a recess 39 provided in the spherical end 7 and extends around a second cross member 41 extending diagonally through the recess 39. On the bottom of the second cross member 41, there is a spherical indentation 43 in which there rests a ball 45 which is supported by a corresponding second indentation 47 in the strap 37. Instead of a ball of a diameter which is at most a fraction, for instance a twentieth, of the diameter of the spherical-segment-shaped end 7, a needle-like tip can also be provided on the strap 37 or the cross member 41 for permitting a substantially point support (not shown in the drawing).

The shaft 19 furthermore passes through a bushing 49 which serves for the bracing of a spring 51 which is introduced under initial stress between the cross member 35 and the sleeve 29. The spring 51 preferably consists of a number of Belleville springs.

Instead of the axially arranged spring 51, there could also be used a Belleville spring or helical spring which acts from above on the end of the holding sleeve 29 (not shown in the drawing).

In the showing of FIG. 1, the instrument holder 5 rests in freely movable manner on the small ball 45. The spherical end 7 is lifted off from the inner bore 17 of the clamping ring 15 and the end surface 33 of the holding sleeve 29 also is at a distance from the surface of the spherical end 7. The small ball 45 rests in the second indentation 47 in the strap 37, which, together with the holding sleeve 29, is lifted by the two eccentric disks 25 on the shaft 19 against the force of the spring 51. An instrument 12, for instance a microscope, which is clamped in the cylindrical clamp 11 of the instrument holder, comes, substantially without friction, into an equilibrium position (see position shown in FIG. 2). As soon as the equilibrium position has been reached, the holding sleeve 29 can be lowered with respect to the shaft 19 and the holding part 3 by the turning of the shaft 19, for instance by means of the lever 23. Upon the lowering of the holding sleeve 29, which is supported by the force of the spring 51, the instrument holder 5, the spherical end 7 of which is suspended from the strap 37, also descends. In this connection, the spherical end 7 comes against the inner bore 17 of the clamping ring 15 and lies on it along its entire circumference. Upon the further lowering of the holding sleeve 29, the small ball 25 comes out of its position resting in the first indentation 43 on the cross member 41. Shortly thereafter, the end surface 33 of the holding sleeve 29 comes against the spherical end 7. The spherical end 7 is now clamped between the clamping ring 15 and the holding sleeve 29. The holding force is applied by the spring 51. Both the clamping ring 15 and the holding sleeve 29 have a large resting surface, with the spherical end 7 in each case each approximating the contour of the ball.

I claim:

1. A spherical suspension for a technical instrument, the suspension comprising:

holding means, an instrument holder having a spherical-segment-shaped end, said holding means receiving and mounting said spherical-segment-shaped end of said instrument holder;

a device for locking said instrument holder with respect to said holding means; and a resting means located in the center of said spherical-segment-shaped end, said resting means providing a substantially punctiform resting of said instrument holder in said holding means.

2. A spherical suspension for a technical instrument, the suspension comprising:

holding means, an instrument holder having a spherical-segment-shaped end, said holding means receiving and mounting said spherical-segment-shaped end of said instrument holder;

a device for locking said instrument holder with respect to said holding means; and a resting means located in the center of said spherical-segment-shaped end, said resting means providing a substantially punctiform resting of said instrument holder in said holding part;

a strap connected to said holding means;

wherein said resting means comprises a punctiform support configured as a ball or a needle-like tip;

said spherical-segment-shaped end has a first indentation for receiving said punctiform support, and said strap has a second indentation for receiving said punctiform support; and said punctiform support is inserted between said first indentation on said spherical-segment-shaped end and said second indentation on said strap.

3. A suspension according to claim 2, wherein said holding means comprises a holding sleeve and a holding part which encloses said sleeve;

said strap is fastened on said holding sleeve; and said sleeve is displaceable vertically and lockable in said holding part.

4. A suspension according to claim 3, further comprising a rotatable shaft with eccentric disks and serving to support said sleeve within said holding part;

wherein said holding sleeve is suspended on said shaft by said eccentric disks; and said sleeve is displaceable relative to said holding part by a turning of said eccentric disks.

5. A suspension according to claim 3, wherein said holding part includes a clamping ring for contacting a lower portion of said spherical-segment-shaped end, and said sleeve has lower end surface for contacting an upper portion of said spherical-segment-shaped end;

said lower end surface of said sleeve and said clamping ring lie, in a raised position of said instrument holder, spaced apart from said spherical-segment-shaped end; and said clamping ring and the lower end surface of said sleeve rest snugly on the surface of the spherical-segment-shaped end in a lowered position of said holding sleeve and said instrument holder.

6. A suspension according to claim 3, further comprising a prestressed spring disposed between said holding part and said holding sleeve.

7. A suspension according to claim 6, wherein said holding sleeve comprises a cross member, and said spring is disposed between said shaft and said cross member of said holding sleeve.

8. A suspension according to claim 6, wherein said spring presses, during said lowered position of said holding sleeve, against said spherical-segment-shaped end for urging said spherical-segment-shaped end against said clamping ring.

9. A spherical suspension for a technical instrument, the suspension comprising:

holding means, an instrument holder having a spherical-segment-shaped end, said holding means receiving and mounting said spherical-segment-shaped end of said instrument holder;

a device for locking said instrument holder with respect to said holding means; and a resting means located fully in the center of said spherical-segment-shaped end, said resting means providing a substantially punctiform resting of said instrument holder in said holding part.

10. A spherical suspension for a technical instrument, the suspension comprising:

holding means, an instrument holder having a spherical-segment-shaped end, said holding means receiving and mounting said spherical-segment-shaped end of said instrument holder;

a device for locking said instrument holder with respect to said holding means; and a resting means located in the center of said spherical-segment-shaped end, said resting means providing a substantially punctiform resting of said instrument holder in said holding part during an unlocked state of said locking device, the resting of said instrument holder upon said resting means being terminated during operation of said locking device.

* * * * *